United States Patent [19]

Baumann

[11] Patent Number: 4,739,627

[45] Date of Patent: Apr. 26, 1988

[54] DEVICE FOR AIR CONDITIONING IN A WINTER GARDEN

[76] Inventor: Walter Baumann, Pfarrgartenweg 1, D-7163 Oberrot-Hausen, Fed. Rep. of Germany

[21] Appl. No.: 5,680

[22] Filed: Jan. 21, 1987

[30] Foreign Application Priority Data

Jan. 23, 1986 [DE] Fed. Rep. of Germany ....... 3601973

[51] Int. Cl.⁴ .............................................. F25D 23/12
[52] U.S. Cl. ...................................... 62/263; 62/159; 62/235.1; 47/17; 126/429
[58] Field of Search ...................... 62/519, 524, 324.1, 62/324.5, 263, 440, 531, 159, 235.1; 98/31.6; 47/17; 126/400, 429

[56] References Cited

U.S. PATENT DOCUMENTS

| | | | |
|---|---|---|---|
| 2,333,309 | 11/1943 | Gould | 62/263 X |
| 3,831,395 | 8/1974 | Levy | 62/263 |
| 4,013,120 | 3/1977 | Rheinheimer | 62/263 |
| 4,166,339 | 9/1979 | Heller et al. | 47/17 |
| 4,291,674 | 9/1981 | Comte et al. | 47/17 X |
| 4,301,787 | 11/1981 | Rice | 126/429 |
| 4,306,542 | 12/1981 | Reinert | 126/429 |
| 4,327,560 | 5/1982 | Leon et al. | 62/324.1 X |
| 4,505,328 | 3/1985 | Schmitt | 62/263 X |
| 4,567,732 | 2/1986 | Landstrom et al. | 47/17 X |
| 4,637,223 | 1/1987 | Hosoya et al. | 62/263 |
| 4,649,901 | 3/1987 | Kelly | 126/429 |

Primary Examiner—Lloyd L. King
Attorney, Agent, or Firm—Brumbaugh, Graves, Donohue & Raymond

[57] ABSTRACT

A device is disclosed for air conditioning in a winter garden, more particularly for dehumidifying a winter garden in order to avoid formation of perspiration and condensation water, the device having a housing (16) in which first, second and third heat exchanger means (26,28,30) are selectively connectable to a compressor means (32). Communication between said heat exchanger means and compressor means may selectively be established in such a manner that the winter garden can be dehumidified, cooled or heated, as required. At the same time, the device permits heat from the winter garden to be recovered for use in the dwelling house (10).

9 Claims, 3 Drawing Sheets

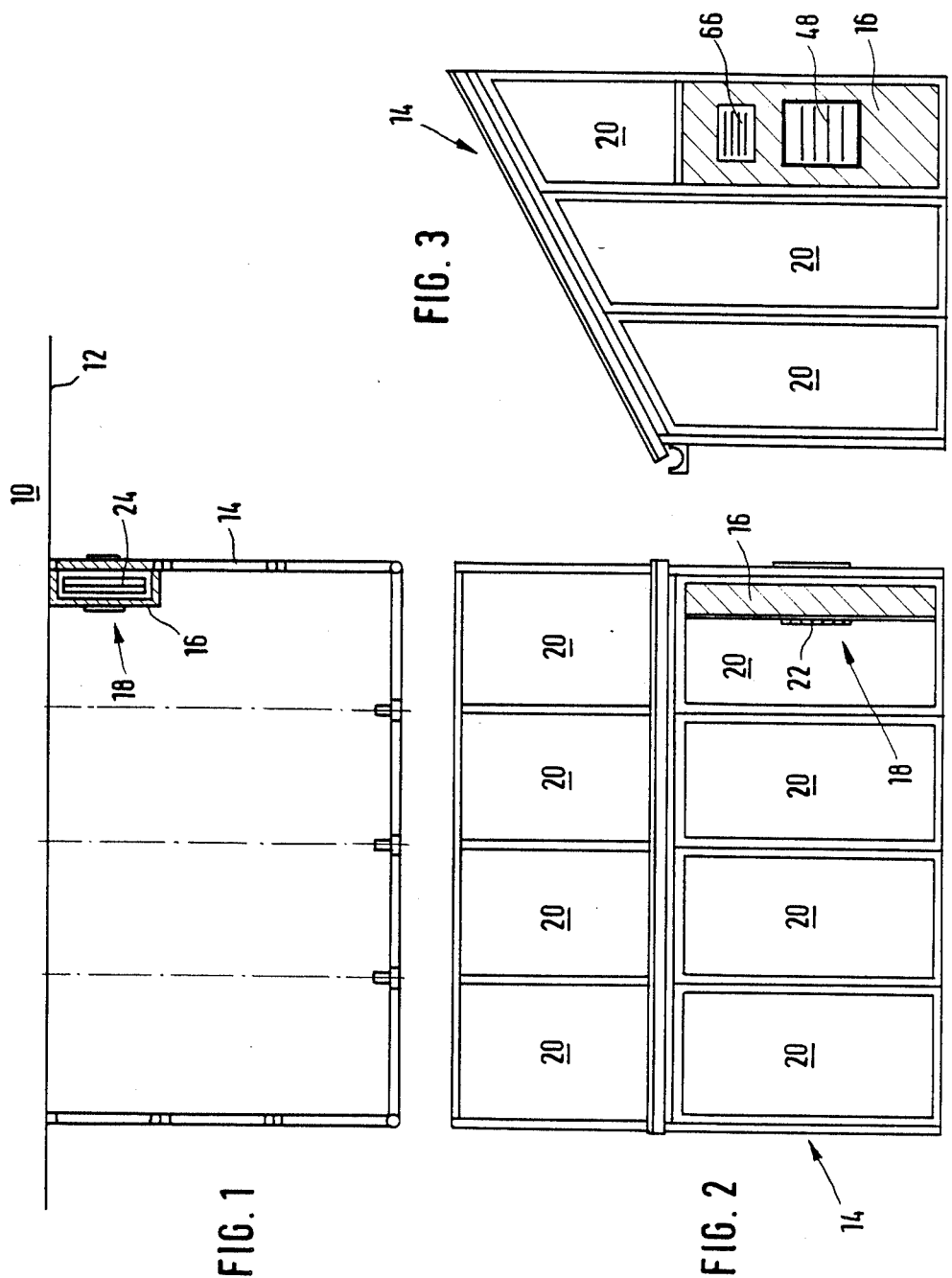

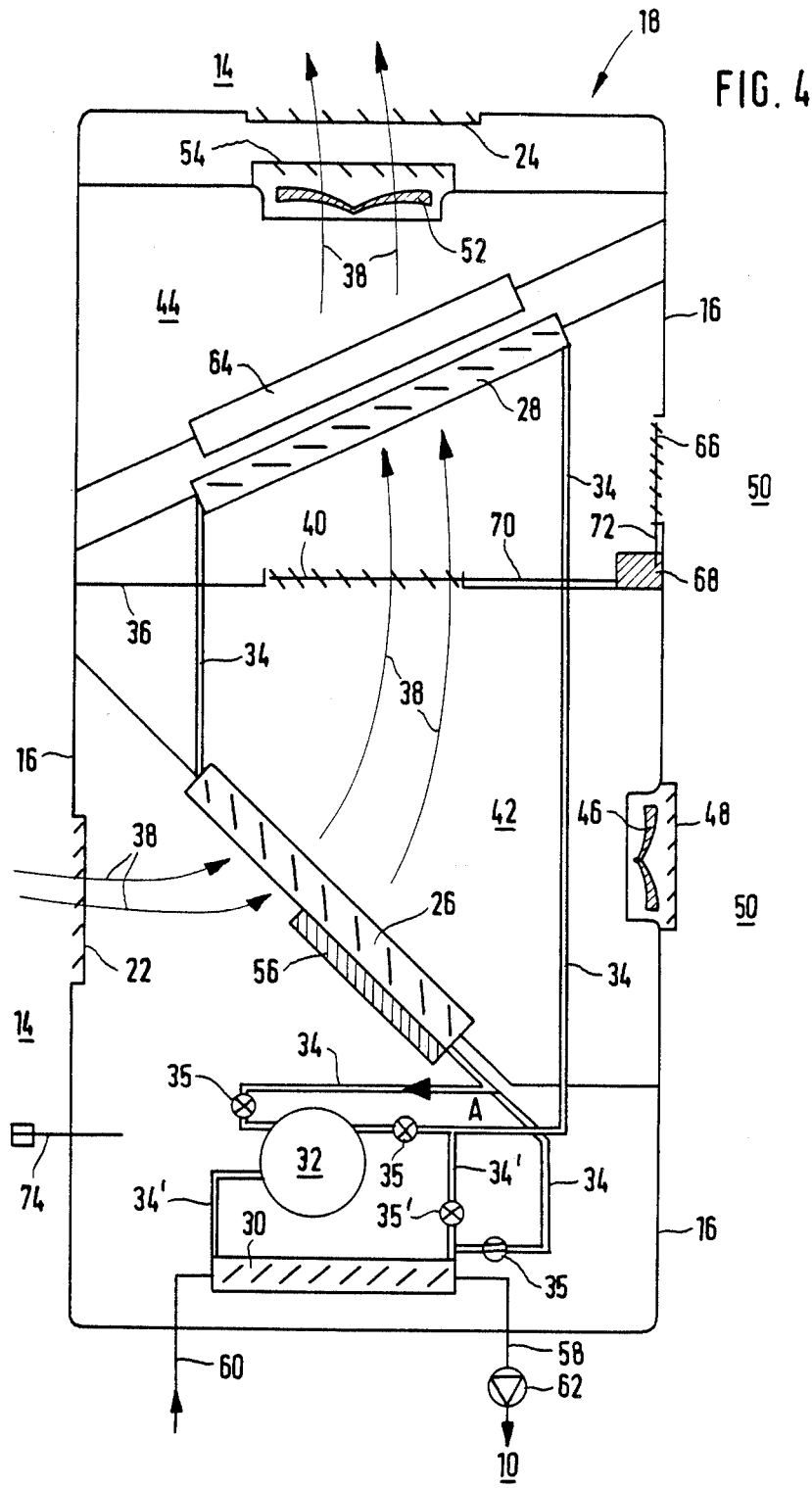

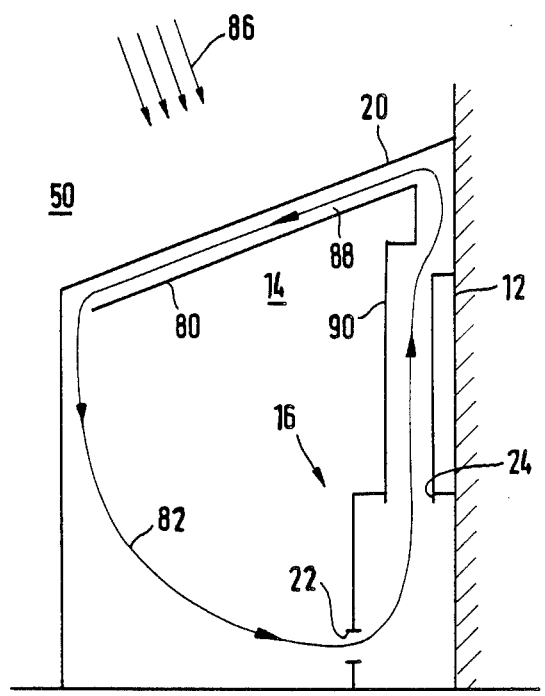

4,739,627

DEVICE FOR AIR CONDITIONING IN A WINTER GARDEN

BACKGROUND OF THE INVENTION

The present invention relates to a device for controlling the temperature and/or air humidity in a winter garden.

The term "winter garden " is understood to mean a room generally surrounded by glass and which is either disposed separately from a dwelling house or is, preferably, essentially integrated into such house. Such winter gardens permit the cultivation of plants which otherwise would not be able to pass the wintertime outside in the open nature.

Air conditioning in a winter garden, that is, especially, controlling its temperature and air humidity, means satisfying exacting requirements in terms of building physics. More particularly, allowance must be made for the fact that, under solar irradiation, a winter garden may heat considerably even though temperatures in the outdoor atmosphere would be rather low. The control of air humidity in a winter garden constitutes a particular problem. In fact, when the temperature inside a winter garden is higher than that prevailing outdoor, excessive air humidity will cause the panels of the winter garden to fog with condensation water, which considerably reduces the comfort which may be derived from the use of the winter garden.

If a winter garden is to be habitable all the year over, which is especially desirable when the winter garden is integrated into the dwelling house, one will also have to face serious energy problems. On the one hand, under certain climatic conditions, using a winter garden involves considerable expenses for heating, while, on the other hand, with still other climatic conditions, one must take into account that a winter garden may constitute a source of energy for the dwelling house. It is especially in sunny, cold weather that a winter garden will absorb a considerable amount of solar energy which should not be wasted.

SUMMARY OF THE INVENTION

It is an object of the present invention to provide a device capable of controlling the temperature and/or air humidity in a winter garden all the year over.

It is another object of the present invention to provide a device for controlling the temperature and/or air humidity in a winter garden which, under certain climatic conditions, would permit transferring energy from the winter garden to a dwelling house.

It is still another object of the present invention to provide a device for controlling the temperature and/or air humidity in a winter garden that may be installed as a compact unit in the winter garden and permits fully automatic all-year air conditioning in the winter garden without the need for special user interference.

The problem as outlined in the foregoing is solved according to the present invention with a device for air conditioning in a winter garden which comprises a housing having a suction port through which air from the winter garden is taken in into said housing;

an exhaust port through which air from said housing is supplied into the winter garden;

at least first and second heat exchanger means disposed in the main flow path of air between said suction and exhaust ports; and a compressor means, connected to a first liquid circuit which contains said both heat exchanger means.

With such a device, under favourable climatic conditions, in order to be able to also recover energy from the winter garden for use in the heating system or water heating of a dwelling house, preferably third heat exchanger means is provided which is connected to said compressor means in a second circuit. In this case, said first heat exchanger means of the device serves as an evaporator, while the third heat exchanger means will serve as a liquefier (condenser). The second heat exchanger means is, in this case, without any function.

Under certain outdoor and indoor temperatures, when a hygrostat determines that the air humidity in the winter garden is excessive, the device will be automatically controlled in such a manner that said first heat exchanger means serves as an evaporator and said second heat exchanger means serves as a liquefier. In this instance, it is the third heat exchanger means that fulfills no function.

The device of the present invention permits also selective cooling of the winter garden. To this effect, said first heat exchanger means serves as a liquefier, while said second heat exchanger means functions as an evaporator, the main flow path between said two heat exchanger means being interrupted, said second heat exchanger means taking in air from the outdoor atmosphere, and said first heat exchanger means delivering air into the outdoor atmosphere.

In a preferred embodiment of the device according to the present invention, a separate heating device is provided which is disposed in the main flow path directly downstream of said second heat exchanger means.

The device according to the present invention may also be operated as a heat pump, for example, in order to heat the winter garden even at lower outdoor temperatures (e.g., of 12 ° C.). To this effect, with a view to its operation as a heat pump, provision is made for said housing to have a suction port open to the outdoor atmosphere as well as an exhaust port also leading to the outdoor atmosphere, one of said heat exchanger means being connected into the flow path between said suction and exhaust ports so as to operate as an evaporator for extracting energy from the air flow which circulates from the outdoor atmosphere into said housing and back again into the outdoor atmosphere, and it is further arranged for the extracted energy to be supplied via said compressor means to a heat exchanger means which serves as a condenser, to be fed into a heating circuit of the dwelling house or of the winter garden.

With heavy solar irradiation, it is often necessary for winter gardens to be shadowed. In the prior art, the blind used for obtaining obscuration is arranged exteriorly of the glass walls of the winter garden. The device of the present invention permits a blind to be mounted at the interior of the glass walls of the winter garden, whereby solar energy accumulated between the walls and said blind as a result of air heating is used by means of the device for the heating of the house, for example, and at the same time, the temperature in the rest of the winter garden is controlled to a comfortable level. To this effect, when referred to the direction of incidence of solar radiation, behind the glass wall of the winter garden a blind is extensibly arranged so that between said glass wall of the winter garden and said blind a small space, as compared with the total winter garden volume, is formed in which, when the winter garden is otherwise shadowed, the irradiated solar energy heats the air; and a device for controlling the temperature and/or air humidity, having an exhaust port and a suction port, is connected to said space defined between said blind and said wall in such a manner that an air circuit is formed which passes across said housing of the device, the air which has heated in said space passing at least through one of said heat exchanger means which serves as an evaporator, so that the heat is extracted from the air and transported via said compressor means to another heat exchanger means where the energy is fed into a heating circuit.

BRIEF DESCRIPTION OF THE DRAWINGS

These and other objects and advantages of the invention will be better understood when studying the following description of an embodiment of the invention, with reference to the drawings in which:

FIG. 1 is a top view of a winter garden installed adjacent to a dwelling house;

FIGS. 2 and 3 are elevational views of the winter garden equipped with the device of the invention;

FIG. 4 is a schematic illustration of the device for air conditioning in the winter garden and for energy extraction; and FIG. 5 shows a cross-sectional view, in a vertical plane, through a winter garden equipped with a blind to permit its obscuration.

DETAILED DESCRIPTION OF THE INVENTION

With reference to FIG. 1, a dwelling house 10 is shown, the wall of which has been schematically represented by reference numeral 12, and adjacent to which a winter garden 14 is situated. Inside winter garden 14, together with a compact housing 16, the device 18 is accommodated for air conditioning in the winter garden as well as for recovering energy to be used for said dwelling house. In a conventional manner, winter garden 14 comprises a plurality of glass panels 20.

The illustrations of FIGS. 2 and 3 are elevational views of winter garden 14 as well as of housing 16 for the device 18 for air conditioning and heat recovery.

As shown in FIG. 4, housing 16 is formed with a suction port 22 through which the air from within winter garden 14 may be taken in into said housing. The air is returned to winter garden 14 through an exhaust port 24.

Contained in housing 16 are first, second and third heat exchanger means 26, 28 and 30, as well as compressor means 32 to which said heat exchanger means are selectively connectable. For dehumidification and cooling of winter garden 14, one or more than one of said heat exchanger means will selectively cooperate with said compressor means 32 in such a manner that they will alternatively serve as evaporators or as liquefiers (condensers). Communication may be selectively established each time for two of said three heat exchanger means with said compressor means 32 through refrigerant circuits 34 and 34' and valves 35 and 35' in such a manner that they may alternatively serve as evaporators or as liquefiers.

Inserted into the main flow path 38 between said first and second heat exchanger means is a partition wall 36 which defines a first chamber 42 and a second chamber 44 between which mutual communication may be established through louver means 40 which is actuatable into a closed position.

First chamber 42 is formed with suction port 22 and is provided with a fan 46 mounted on the side of said first heat exchanger means 26 which is opposite to said suction port, said fan being capable of delivering air from the inside of said first chamber 42 to the outdoor atmosphere 50. This communication way may be closed by closure louver means 48.

Inside said second chamber 44, within said main flow path 38, and downstream of second heat exchanger means 28, another fan 52 as well as closure louver means 54 are provided through which air can be supplied from said second chamber 44 into the winter garden 14.

First chamber 42 includes a condensation water trough 56, installed beneath said first heat exchanger means 26. Also, compressor means 32 and said third heat exchanger means are mounted inside said first chamber 42. Flow pipe 58 and return pipe 60 connect said third heat exchanger means 30 to the heating or the hot-water installation of dwelling house 10. A circulation pump 62 is built into said flow pipe 58.

Furthermore, said second chamber 44 is provided with louver means 66 which permit communication between said chamber and the outdoor atmosphere 50. Louver means 40 and 66 are actuatable, via respective operating rods 70 and 72, by means of a servomotor 68.

As a unit, the device 18 for air conditioning and energy recovery is electrically controlled. To this effect, especially (not shown) temperature sensors are provided to determine the prevailing temperature inside the winter garden 14, the outdoor temperature and, if necessary, also the temperature of the water circuit 58,60 of the heating system of house 10. Air humidity inside the winter garden 14 is measured by an hygrostat 74.

In the following, it is desired to give a more detailed description of the functioning of device 18 in its different modes of operation.

(1) Dehumidification

At given outdoor and indoor temperatures, when hygrostat 74 detects air humidity inside winter garden 14 to be of an excessive level, liable to cause condensation water to form, particularly on panels 20, device 18 will function to dehumidify winter garden 14. In this case, by actuating valves, communication is established between first and second heat exchanger means, on the one hand, and compressor 32 means, on the other hand, to form a circuit. First heat exchanger 26 serves as an evaporator. The air taken in (as main flow path 38) through suction port 22 from winter garden 14 passes into housing 16 and through said first heat exchanger means 26, where water, extracted from the air, condensates on said heat exchanger means 26 and, in doing so, gives off heat into the refrigerant within said heat exchanger. The condensate then flows into condensation water trough 56. Accordingly, the process which takes place at first heat exchanger means 26 is an absorption of energy by condensing the air humidity. The evaporated refrigerant, e.g. Frigen, is taken in by compressor 32 in the direction shown by arrow A, and compressed therein. It leaves compressor 32 in a state of high compression and passes through line 34 (with valve 35 open) to said second heat exchanger means 28 which now serves as a liquefier (condenser). At said liquefier, the energy which is recovered when the refrigerant changes from its gazeous to a liquid state, is given off to the exterior; in other terms, the air which reaches said second heat exchanger 28 within the main flow path 38 is reheated in order to avoid cold air to be exhausted into winter garden 14 through exhaust port 24. Thermodynamically speaking, the process of dehumidification just described corresponds approximately with that which is taking place in a compression-type refrigerator. A restrictor, not shown, is connected between the evaporator and the liquefier means.

(2) Heat Recovery

Under favorable weather conditions (that is, heavy solar irradiation at low outdoor temperatures), the present device 18 serves to make available for utilization in said dwelling house 10, the energy which would be recovered out from said winter garden 14 due to solar irradiation. To this effect, communication is established between said first and third heat exchanger means 26 and 30 and compressor means 32 via suitable piping, not shown, to form a refrigerant circuit. In this case, first heat exchanger 26 serves as an evaporator, while second heat exchange means 30 serves as a liquefier. The air passes along main flow path 38 across housing 16 (which means that louvers 48 and 66 are closed). The warm air from winter garden 14 which is conducted through said first heat exchanger means 26 (evaporator) gives off energy to this heat exchanger 26, so that said refrigerant will evaporate. Accordingly, the air leaving said first heat exchanger 26 will have been cooled down, whereas the evaporated refrigerant passes into compressor means 32 where it is going to be condensed. It is then liquefied in said third heat exchanger means, which in this case serves as a liquefier, whereby energy is released and given off to heating circuit 58,60 of dwelling house 10.

(3) Aeration and Ventilation

Under certain weather conditions, e.g. in midsummer time, easy aeration and ventilation of a winter garden is desirable. To this effect, louvers 40 are closed, and louver means 48 and 66 are both opened. Under these circumstances, main flow path 38 is closed and, instead, two independent aeration systems are formed.

In the first one, fan 46 takes in air from winter garden 14 through suction port 22 into first chamber 42, which air is exhausted through open louvers 48 into the outdoor atmosphere 50. In this manner, ventilation of winter garden 14 is obtained.

The second system functions to have fresh air from the outdoor atmosphere 50 taken in by fan 52 through louvers 66 and delivered through exhaust port 24 into winter garden 14. Louver means 40, 58, 54 and 66 are automatically operated by the electronic control equipment.

(4) Cooling

When it is intended to cool the winter garden 14, louvers 40 are closed, while the remaining openings, particularly louvers 48 and 66, are open. Both fans 46 and 52 are in operation. Second and first heat exchange means 28 and 26 are in communication with compressor means 32. Second heat exchange means 28 serves as an evaporator. From the outdoor atmosphere 50, warm air is taken in past louvers 66 and is directed towards said second heat exchange means (evaporator) where it gives off heat to said second heat exchanger 28, so that the refrigerant evaporates. Thus, when leaving second heat exchange means 28, the air will have been cooled down. Accordingly, it is cold air which is admitted through exhaust port 24 into winter garden 14. In order to have a closed refrigerant circuit when operating in this mode, first heat exchange means 26 functions as a liquefier. The energy which the refrigerant has absorbed at the second heat exchange means 28 (evaporator) will be released at the first heat exchanger 26 (liquefier) into the air which then, with louvers 40 closed, will pass through suction port 22 towards open louver means 48. In other terms, air coming from winter garden 14 will be exhausted as warmed air into the outdoor atmosphere 50. The system functions in a manner similar to that of an ordinary compression refrigerator. The third heat exchange means 30 will not be functioning when in this mode of operation.

(5) Heating

For heating winter garden 14, a separate electric heating device 64 is provided. Said electric heating device may be replaced by a water heat exchange unit. In the heating mode of the winter garden, first, second and third heat exchange means 26, 28 and 30 will not be operating. Louver means 48 and 66 are closed, while louvers 40 are open. By means of fan 52, air is taken in from winter garden 14 along main flow path 38 and returned to it as warm air through exhaust port 24.

It is apparent from the foregoing that the inventive device 18, which makes use of a small number of units that can fulfill different functions, permits dehumidification of the winter garden, recovering heat to be used in the dwelling house, aeration and ventilation of the winter garden as well as cooling and heating of the winter garden. The entire installation can be controlled fully automatically. Accordingly, there is no need for the habitants to interfere.

In FIG. 5, a winter garden is illustrated which may be shadowed or shielded against sunshine by means of a blind 80. Between said blind 80 and glass wall 20 of winter garden 14, an elongated, shallow space 88 is formed which is small when compared with the remaining volume of winter garden 14. Sunbeams which are incident along the direction shown by arrows 86, are prevented from reaching the interior of winter garden 14 by said blind 80 and heat the air contained in said space 88.

From housing 16 of the device for controlling the temperature and/or air humidity in the winter garden, as above described, a channel 90 is leading to an upper inlet to space 88 between said blind 80 and glass wall 20 of the winter garden, as shown in FIG. 5. Fan 52 and the openings in said housing are set to such positions that the air flow from the upper port 24 of housing 16 enters channel 90, and that an air circuit 82 is formed as shown in FIG. 5. This circuit 82 causes the air which has been heated in said space 88 due to solar irradiation, to enter housing 16 of the device in the direction shown by arrows through port 22 and is cooled therein at heat exchange means 26 which functions as an evaporator. The cooled-down air is blown through port 24 into channel 90, thus closing the circuit 82. In this manner, a high level of comfort is obtained in the winter garden by shielding it against solar radiation and controlling its temperature; at the same time, it is possible to use the solar energy trapped between said blind 80 and said glass wall 20 for the heating circuit of the dwelling house or for heating the winter garden itself. It is important that channel 90 leads to the section of space 88 which is at a higher level. A uniform distribution of circuit 82 throughout space 88 is assured by the arrangement of suitable baffles downstream of channel 90.

I claim:

1. A device for controlling temperature and humidity in a winter garden, which comprises:
   a housing divided into at least a first and second chamber adapted for positioning inside the winter garden;
   said first chamber having disposed therein a first heat exchanger, and a condensation water trough, and said first chamber having a closable suction port through which, when open, air can flow between said first chamber and the exterior of the housing;
   said second chamber having disposed therein a second heat exchanger and having a closable exhaust port through which, when open, air can flow between said second chamber and the exterior of the housing;
   a closable louver connecting said first chamber to said second chamber such that, when the louver is open, air can flow through said louver between said first chamber and said second chamber;
   a compressor connected to a first liquid circuit containing the first and second heat exchangers; and
   a third heat exchanger connected to said compressor by a second liquid circuit and adapted for connection to a flow pipe to and a return pipe from a heating installation of a dwelling.

2. The device according to claim 1, wherein said first and second chambers each include a closable vent means disposed in a wall of the housing different from said suction and exhaust ports through which, when open, air can flow between said chambers and the exterior of the housing.

3. The device according to claim 1, further comprising a separate heating device disposed within said housing.

4. A method for dehumidifying a winter garden, which comprises:
   installing the device of claim 1 in the winter garden such that both the suction port and the exhaust port connect the interior of the housing with the interior of the winter garden;
   opening said suction and exhaust ports and the closable louver whereby a closed loop of air flow is formed through the housing and the interior of the winter garden;
   operating the first heat exchanger as an evaporator; and
   operating the second heat exchanger as a liquifier.

5. A method for recovering heat from a winter garden for use in a dwelling, which comprises:
   installing the device of claim 1 in the winter garden such that both the suction port and the exhaust port connect the interior of the housing with the interior of the winter garden;
   opening said suction and exhaust ports and the closable louver, whereby a closed loop of air flow is formed through the housing and the interior of the winter garden;
   operating the first heat exchanger as an evaporator; and
   operating the third heat exchanger as a liquifier.

6. A method for cooling a winter garden, comprising installing a device according to claim 2 adjacent to a side wall in the winter garden, such that the suction and the exhaust ports connect the interior of the housing to the interior of the winter garden, and such that said closable vent means connect the interior of the housing with the outdoor atmosphere;
   closing the closable louver between said first and second chambers;
   opening said suction and exhaust ports and said vent means whereby paths for air flow between the interior of the winter garden and the outdoor atmosphre through each of said chambers are created;
   operating the first heat exchanger as a condenser; and
   operating the second heat exchanger as an evaporator, wherein air flows from the winter garden through said first chamber to the outside atmosphere, and from the outside atmosphere through said second chamber into the winter garden.

7. A method for pumping heat from the outdoors into a structure, which comprises:
   installing the device of claim 1 in a wall adjacent to the side of the structure such that the suction and exhaust ports connect the interior of the housing with the outdoor atmosphere;
   opening the ports to the outdoor atmosphere and the closable louver, whereby air can flow from the outdoor atmosphere through the housing and back to the outside atmosphere;
   operating the first heat exchanger as an evaporator such that energy is extracted from outdoor air flowing through the housing;
   supplying the extracted energy from the compressor to the third heat exchanger;
   operating the third heat exchanger as a condenser to release the extracted energy as heat; and
   supplying released heat to a heating installation in the structure.

8. A winter garden which comprises
   a glass wall facing predominantly in the direction if solar irradiation;
   a blind positioned inside said glass wall, which along with said glass wall, defines a narrow space in which air may be heated by solar radiation; and
   a device for controlling temperature and humidity according to any one of claims 11-13

9. A winter garden which comprises:
   a glass wall facing predominantly in the direction of solar irradiation;
   a blind positioned inside said glass wall, which along with said glass wall, defines a narrow space in which air may be heated by solar radiation; and
   a device for controlling temperature and humidity in the winter garden comprising a housing having a suction port and an exhaust port, said exhaust port being connected to the narrow space so as to create a closed loop air circuit within the winter garden flowing through the housing into the narrow space and then returning to the housing;
   a first heat exchanger disposed inside said housing;
   a compressor connected to said first heat exchanger; and
   a second heat exchanger connected to said compressor and connectable to a heating circuit.

* * * * *

UNITED STATES PATENT AND TRADEMARK OFFICE
CERTIFICATE OF CORRECTION

PATENT NO. : 4,739,627
DATED : April 26, 1988
INVENTOR(S) : Walter Baumann

It is certified that error appears in the above-identified patent and that said Letters Patent is hereby corrected as shown below:

Column 8, lines 12-13, "atmosphre" should read --atmosphere--;

Column 8, line 41, "if" should read --of--;

Column 8, line 47, "claims 11-13" should read --claims 1-3.--;

Column 8, line 53, after "radiation;" delete "and".

Signed and Sealed this

Fourth Day of October, 1988

Attest:

DONALD J. QUIGG

*Attesting Officer*  *Commissioner of Patents and Trademarks*